Jan. 30, 1968 R. A. LANDRUM ET AL 3,366,783
COMPUTING DEVICE FOR SEISMIC SIGNALS
Filed April 10, 1964

RALPH A. LANDRUM
DANIEL SILVERMAN
INVENTOR.

BY *William T. McClain*

ATTORNEY.

United States Patent Office 3,366,783
Patented Jan. 30, 1968

3,366,783
COMPUTING DEVICE FOR SEISMIC SIGNALS
Ralph A. Landrum and Daniel Silverman, Tulsa, Okla., assignors to Pan American Petroleum Corporation, Tulsa, Okla., a corporation of Delaware
Filed Apr. 10, 1964, Ser. No. 358,751
14 Claims. (Cl. 235—181)

ABSTRACT OF THE DISCLOSURE

This application describes a computing system especially adapted for processeng seismic signals. It utilizes the best features of two types of time delay means. The first type delay means is the type in which the signal distortion is an increasing function of time delay, such as a series of lumped inductance-capacitance delay line units. Such delay line has a plurality of taps which are useful for taking off the signals passing through the delay line. The taps can be as close as one millisecond or less apart. The second type time delay apparatus used is one in which distortion is constant with time delay, such as, for example, a magnetic recording medium having read or pickup heads spaced along the record. The spacing between the pickup heads provides long time delay as compared to the pickup taps on the lumped inductance-capacitance delay line.

Figure 1:
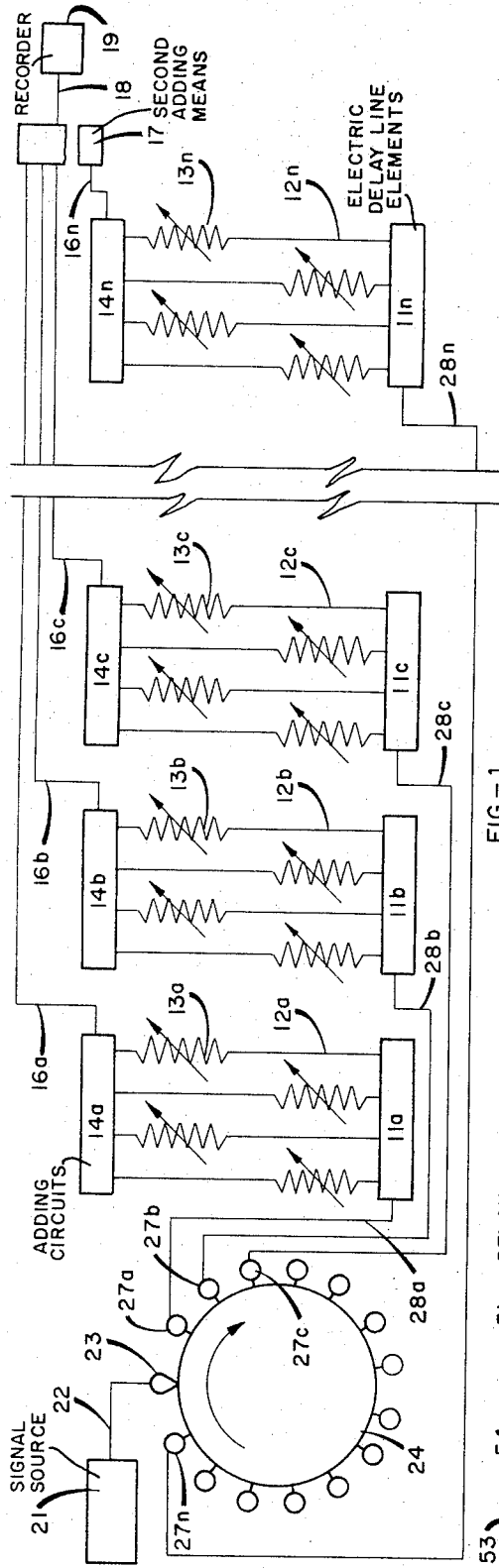

The output taps of each of the first type delay line are provided with a potentiometer which is set according to a second function upon which it is desired to operate upon the first function passing through the delay lines. The outputs of these potentiometers are all added together to obtain a final signal resembling the seismic signal which is sought.

---

This invention relates to computing devices of the type employing an electrical delay line wherein a plurality of functions are multiplied and the resulting products summed. More particularly, the present invention relates to such a delay line device providing a reduction in signal distortion.

In solving physical problems, one is often interested in determining the degree of correlation which exists between two sets of measurements. For example, in the interpretation of seismic traces it is often desirable to determine the degree of correlation between a seismographic trace and a known seismic signal. The computations required to determine the degree of correlation between such measurements involve the multiplication of paired values of two inputs and the summation of the resulting products over a time period, while shifting the time-phase relationship between the two inputs. For example, U.S. Patents 2,779,428 and 2,989,726 disclose the use of such correlation techniques in seismographic operations.

The use of analog computing equipment in correlation analysis for determining the degree of correlation between two or more sets of physical measurements is well known. For example, the article "Cross-Correlation Filtering" by Jones, et al., Geophysics, volume 19, No. 4, October 1954, pages 660 to 683, describes apparatus and techniques employed for this purpose. Further, the use of electrical delay lines in analog computers employed in the study of seismic records is well known and is described in the article, "MURAC—A Multiple Reflection Analog Computer," by Silverman et al., Geophysics, volume 28, No. 6, December 1963, pages 975 to 989. However, the use of presently available electrical delay line correlators is limited in the nature of the signals which may be fed into the correlator. Electrical delay lines employed in analog computers generally comprise lumped inductance-capacitance delay line elements, i.e., lumped series inductances and shunt capacitances. These inductances and capacitances act like band pass filters, with a certain delay. This means that over a limited range of frequencies they will act the same to each signal. However, outside of this band they will attenuate higher frequencies, and so will distort complex signals made up of different frequencies. Therefore, the design of inductances and capacitances used in the line is critical to obtaining high fidelity of the signal transmitted over the line. Even so, with presently available equipment it has been found that highly undesirable signal distortion occurs where a long time function is applied to the delay line, and the degradation of the signal applied to the line limits the nature of the signal which may be fed into the apparatus.

The primary object of the present invention is an improved electrical delay line computer capable of handling a relatively long time signal with a minimum of distortion. Other objects of the invention will become apparent by reference to the following description of the invention.

Briefly, the present invention provides improved computing apparatus comprising first electrical signal time delay means comprising a multiplicity of short time delay units connected in series to provide a maximum total time delay, "T," less than that producing undesirable signal distortion, said first time delay means being provided with a plurality of take-out taps connected to the junctions of said time delay units for presenting at specific time delays a first electrical signal applied to said delay line, potentiometric means connected to each of said taps for multiplying the voltage at each tap location by a factor representative of a second function applied to said apparatus, electrical adder means for integrating the outputs of said potentiometric means, second electrical signal time delay means having an amplitude versus frequency characteristic which is constant with varying time delays and which comprises a plurality of time delay channels providing varying time delays which are increments of time delay T, each of said time delay channels being connected in series to said first time delay means, said potentiometric means and said adder means to provide a plurality of parallel computer channels having varying time delays.

In one embodiment of the invention a succession of delay line elements, each being of a length less than that which produces an undesirable distortion of the input signal, is utilized, with the delay line elements each receiving a recorded signal from a magnetic recorder at different time delays based on the total time delay of those delay line elements preceding the particular delay line element to which the signal is being presented at the time.

In another embodiment of the invention, a single delay line element of the above type is employed and connected in parallel to a plurality of potentiometric networks, the outputs of each such potentiometric networks being added by an electrical adder system. A multiple track magnetic recorder having a plurality of record heads and corresponding pickup heads is employed, the record heads being each connected to one of a first group of adders for adding the potentiometer outputs and the pickup heads being each connected to a second adder means to present thereto electrical signals representative of the outputs from the corresponding first adders at incrementally increasing time delays, the time delay increments being integrals of the time delay of the electrical delay line.

Figure 2:
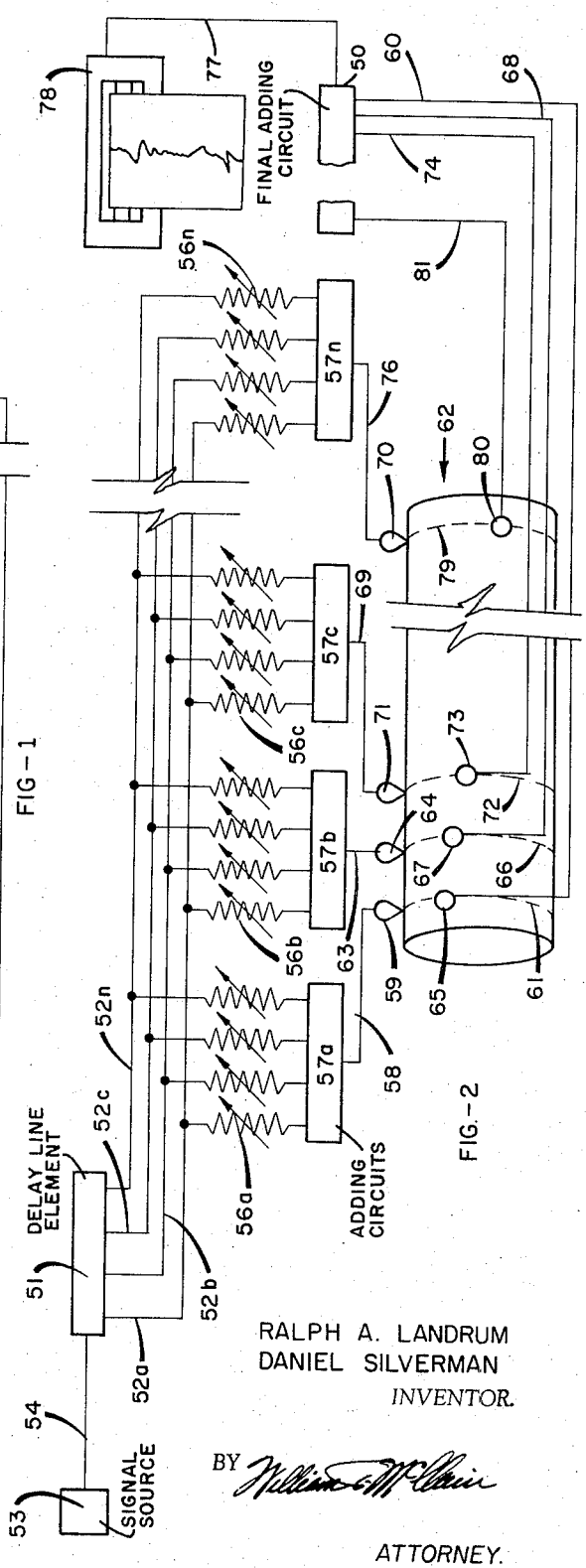

Our invention will be better understood by reference to the following description of preferred embodiments of the invention given in connection with the accompanying drawings wherein:

FIGURE 1 diagramatically illustrates one embodiment of a computing device in accordance with the invention wherein multiple electrical delay line elements are employed with a magnetic drum recorder; and FIGURE 2 diagrammatically illustrates another embodiment of the invention wherein a single electrical delay line element is employed in connection with a multiple track magnetic drum recorder.

Typically, an electrical delay line employed in an analog computer comprising a series of lumped inductance-capacitance delay line units for the time delay of an alternating current signal representative of a function applied to the apparatus. A number of delay line units, each providing a relatively short time delay, for example a one millisecond delay, may be connected in series to provide a delay line element having the desired total time delay. If desired, a plurality of such delay line elements then may be connected in series to provide an even greater total time delay, typically at least equal to the duration of the function fed into the delay line. For example, approximately 100 delay line units may be serially connected to form a delay line element, providing 100 milliseconds of time delay, and as many as 50 or more such delay line elements may be connected in series to provide a total time delay of 5,000 milliseconds. Of course, the time delay provided by a particular delay line may vary according to the requirements and design of the particular delay line, and the above description is only for the purpose of illustration.

In the analysis of seismic signals it is often desirable to correlate one seismic trace with another signal, for example to differentiate between a true signal and background noise. In such an operation, a seismic trace produced by recording the outputs of a spread of seismometers may be correlated with a known signal, often called a pilot signal, which is relatively free from the effects resulting from passing seismic wave signals through the earth. In the correlation process the two signals are multiplied together and the resulting products integrated over a period of time, while shifting the time-phase relationship of the two input signals. Analog computing apparatus employing an electrical delay line network has heretofore been used for carrying out the above cross correlation. In prior art apparatus, the length of the electrical delay line has been such as to provide a total time delay at least about as long as the duration of the seismic signals to be correlated. Typically, such signals may have a duration ranging up to as high as about 8 or 10 seconds. While electrical delay-line-type analog computers are well suited for conducting the above cross correlation, with longer signal durations, and corresponding long delay lines, an undesirable amount of signal distortion results when the signal is transmitted over the long electrical delay line. When an electrical signal is transmitted over an electrical delay line the amplitude versus frequency characteristic of the delay line varies with varying time delays. With relatively short electrical delay lines the amplitude versus frequency characteristic of the delay line produces insignificant signal distortion, and longer delay lines corresponding to the duration of longer seismic signals produce an undesired distortion of the signal so that the accuracy of the cross correlation is adversely affected.

It is known to employ magnetic recording equipment for providing a time delay in a function applied to the recording apparatus. Such magnetic recording systems have been employed for filtering and correlating seismic signals, as described in the article "Magnetic Delay Line Filtering Techniques" by Jones et al., Geophysics, volume 20, No. 4, October 1955, pages 745 to 765. However, magnetic recording equipment, while suitable for providing relative long time delays, is not well suited for providing relatively short time delays. In contrast to the electrical delay line apparatus, the amplitude versus frequency characteristic of a magnetic delay line is constant regardless of the length of time delay.

In the present invention the distortion of an electrical signal representative of a first long time function applied to an electrical delay line computing device is minimized by employing an electrical delay line element having a length less than that producing an undesirable distortion. The present apparatus may comprise either a succession of electrical delay line elements each having a length less than that producing an undesirable signal distortion, or a single such electrical delay line element, connected to a time delay means, such as a magnetic recorder, which has an amplitude versus frequency characteristic constant with time.

Turning now to FIGURE 1, there is illustrated apparatus of the above type utilizing a plurality of electrical delay line elements 11a, 11b, 11c, etc., each comprised of a number of delay line units (not illustrated). Each element is provided with a plurality of spaced take-out taps 12a, 12b, 12c, etc., for presenting the voltage of a first function at specific time delays after being applied to the apparatus. Each element provides a delay less than that causing significant distortion of the first function, typically 100 milliseconds. Connected to the take-out taps of each element is a potentiometric network 13a, 13b, 13c, etc., for multiplying the first function by a second function which is applied to the apparatus by varying the ratio values of the potentiometers of each potentiometric network. The potentiometric networks associated with the delay line elements are connected by electrical leads to corresponding electrical adding circuits 14a, 14b, 14c, etc., which may be one of several well-known types for adding electrical output signals from the potentiometers. Typically, an electrical adding circuit comprises a group of high resistances, each connected to a corresponding potentiometer and connected in parallel to a suitable amplifier. The potentiometer output voltages are thus changed to proportional currents which are added together and amplified to provide a usable output. This output is fed by electrical conductors 16a, 16b, 16c, etc., to a second electrical adding means 17 for adding the outputs from adders 14a, 14b, 14c, etc. The output from adder 17 is fed by electrical conductor 18 to an indicator 19, such as a recorder, to display the output signal which is indicative of the degree of correlation existing between the first and second functions applied to the apparatus. Alternatively, adders 14a, 14b, 14c, etc., may be connected in series, with means provided to assure the proper polarization of the adder outputs, and the output from the last adder in the series then applied to indicator 19.

For clarity and simplification only delay line elements 11a, 11b, 11c and 11n, together with their corresponding potentiometric networks and adders, have been shown. However, in practice a large number, for example 50 or more, of such elements may be employed.

The first function to be applied to the apparatus typically is fed into the system from a signal source 21 which may be a magnetic recorder, a pulse generator or other source of alternating current connected by electrical conductor 22 to recording head 23 which cooperates with magnetic recording tape upon revolving drum 24 to record the first function. Preferably, the electrical input signal is recorded, picked up by pickup head 27a and passed by way of electrical conductor 28a to the input end of the first delay line element 14a.

Magnetic recorders are well known and it is not necessary to describe such magnetic recorders in detail herein. Various such recorders may be utilized in the present invention, however, it is preferred to employ a drum recorder as shown in the drawings. In such a device, a magnetic drum having a suitable magnetic tape mounted on its periphery is rotated at a selected speed by a drive motor and typically is provided with one or more recording heads, pickup heads, and erase heads for applying, reproducing and/or erasing signals recorded on the magnetic tape. The magnetic drum recorder employed in the apparatus of FIGURE 1 typically is a single track recorder employing a single record head 23 and a plurality of pickup heads 27a, 27b, 27c, etc., spaced at intervals around the drum to pick up the signal recorder thereon and to transmit the same to succeeding delay line elements after appropriate time delays. As shown, recorder 24 provides a plurality of relatively long time delay channels connected in parallel to the electrical time delay elements. Each delay channel is connected to a corresponding delay line element to feed the recorded first function to its corresponding delay line element after a time delay corresponding to the total time delay provided by the delay line elements receiving the recorded signal prior to that particular delay line element.

If the drum 24 is rotating at a given speed, the positions of the pickup heads 27b, 27c, etc., relative to the first pickup head 27a will determine the time delay from the signal input until the recorded signal is picked up by each of the pickup heads. The pickup heads are spaced around the drum at intervals so that the time delay from the time of signal input to delay line element 11a until the recorded signal is picked up is equal to the total time delay provided by the preceding electrical delay line elements in the succession. In other words, the time delay between pickup head 27a and pickup head 27b corresponds to the time delay provided by the first electrical delay line element 11a, the time delay between pickup head 27a and the third pickup head 27c corresponds to the total time delay provided by the first and second delay line elements 11a and 11b, and continuing in this manner around the drum until the last pickup head 27n is reached, so that the time delay provided between pickup head 27a and the last pickup head 27n corresponds to the total time delay provided by all the electrical delay elements preceding the last electrical delay element 11n in the series. The electrical signal from each of the pickup heads is transmitted by electrical conductors 28a, 28b, 28c, etc., to corresponding electrical delay line elements, as shown, wherein the recorded signal, after the appropriate time delay is multiplied by the second function applied to the apparatus. As mentioned above the second function is applied to the apparatus by varying the ratio values of the potentiometers in the potentiometric networks 13a, 13b, 13c, etc. As is well known, the individual potentiometers may be set to multiply the tap voltages by a factor equal to or less than unity, the multiplying factor being determined by the position of the divider relative to the resistors forming the potentiometer. The output from each of the adders thus is applied to final adder 17 at varying time delays which are determined by the position of the corresponding pickup heads on drum 24.

It is advantageous to modify the apparatus of FIGURE 1 in a manner similar to the apparatus shown in FIGURE 2. The electrical delay line elements are quite expensive to fabricate and where a very long time delay is required, the cost of fabricating a long electrical delay line system may be prohibitive. However, it is possible to modify the apparatus, as shown in FIGURE 2, to utilize a single delay line element 51 which, typically, may provide a time delay of 100 milliseconds. As before, delay line element 51 is comprised of a number of delay line units and provided with a plurality of take-out taps 52 spaced along the delay line for presenting the first input function at specific time delays. As before, the first function to be applied to the delay line element 51 may be fed into the element by an appropriate signal source 53 connected to the input end by electrical conductor 54. Connected in parallel to electrical take-out taps 52a, 52b, 52c, etc., are a plurality of potentiometric networks 56a, 56b, 56c, etc., for multiplying the voltages at the tap locations by a second function applied to the apparatus by varying the ratio values of the potentiometers of each of the potentiometric networks. The output from each of the potentiometric networks is fed to a corresponding electrical adding circuit 57a, 57b, 57c, etc., of the type mentioned above, which adds the products of the first and second functions from the potentiometric networks. Of course, in practice, a large number of take-out taps are generally present in delay line 51, and likewise a large number of potentiometers and potentiometric networks are used, the number of each depending upon the design of the particular apparatus.

In the apparatus of FIGURE 2, a multi-track magnetic recorder 62 having a plurality of time delay channels is connected in parallel to magnetic delay line element 51, so that the outputs of potentiometric networks 56a, 56b, 56c, etc., are each recorded on one of the channels and presented to a final adding circuit 50 at time delays which are multiple integrals of the total time delay of element 51.

The first electrical adder 57a is connected by electrical conductor 58 to a first record head 59 cooperating with a first recorder track 61 on drum recorder 62 to record thereon the output signal from adder 57a, the recorded signal then being picked up by head 65 and transmitted by electrical conductor 60 to a final adding circuit 50. The output from the second adding circuit 57b is fed by electrical conductor 63 to a second record head 64 cooperating with the second track 66 on the multiple track magnetic drum recorder 62. Spaced around track 66, at an interval providing a time delay corresponding to the total time delay provided by electrical delay line element 51 plus the time from head 59 to head 65, is a pickup head 67 cooperating with the magnetic tape to pick up the output signal from adder 57b recorded on the tape by record head 64 and transmit this signal, after the time delay, by electrical conductor 68 to adder 50. Similarly, the third electrical adder 57c is connected by electrical conductor 69 to a third record head 71 which records the output signal from adder 57c on the third track 72 of the drum. Corresponding third pickup head 73 is spaced from record head 71 at an interval providing a time delay twice that of electrical delay line element 51, plus time from head 59 to head 65 and pickup head 73, after this time delay, picks up the recorded signal and transmits it by electrical conductor 74 to adder 50. The number of potentiometric networks 56a, 56b, 56c, etc., and adding circuits 57a, 57b, 57c, etc., connected in parallel to take-out taps 52a, 52b, 52c, etc., will depend on the total time delay required of the apparatus, and similarly the number of tracks on the magnetic recorder and the corresponding record heads and pickup heads will be determined by the required time delay. The tracks can of course be placed transversely on the drum, or longitudinally with the tracks being separated by means of erase heads. The last potentiometric network 56n and adder circuit 57n, of course, will be connected by electrical conductor 76 to record head 70 on the last track 79 on the tape and pickup head 80 will be spaced to present the recorded signal, after a time delay corresponding to the total time delay provided by delay line 51, by way of electrical conductor 81 to adder 50. Thus, the recorded signals from the multi-track recorder 62 are picked up at intervals of time which are integrals of the time delay provided by delay line element 51, and the recorded signals are presented at corresponding time delays to adder 50 where the outputs of adders 57a, 57b, 57c, etc., are summed. The output from adder 50 is fed by electrical conductor 77 to an appropriate indicator 78, such as a recorder, for displaying the signal output representing the degree of correlation from the first and second functions applied to the apparatus.

As mentioned hereinabove, the magnetic recorder has a plurality of time delay channels provided thereon. It is to be understood that the term "delay channels," as used in connection with such a recorder refers to time delays provided by the spacing of the pickup heads feeding either the delay line elements or the final adder, and such delay channels may be provided by a single track recorder, as in FIGURE 1 or a multi-track recorder, as in FIGURE 2. The term "computer channel" employed hereinabove shall be understood as referring to any one of the parallel paths through the computer, between the input and the output connections, which paths are formed by the series connected components, regardless of the position of such components in the paths. For example, in FIGURE 1 a computer channel includes a time delay channel, a delay line element, potentiometric network, and adder all connected in series, while in FIGURE 2, a computer channel includes the delay line element, poteriometric network, adder, and time delay channel connected in series.

The foregoing description of the preferred embodiments of the invention has been given for the purpose of exemplification and from the description various modifications and alterations, falling within the spirit and scope of the invention, will become apparent to one skilled in this art.

We claim:
1. A computing system for operating upon a first time function by a second time function which comprises:
   first time delay means comprising at least two elements in which the signal distortion in each element is an increasing function of time delay, each said element having a plurality of time-spaced output taps;
   a plurality of potentiometric units, one connected to each said output taps for multiplying the voltage at each tap by a predetermined factor, representative of said second time function;
   adding means connected to the outputs of said potentiometric units;
   second time delay means of a second type in which the distortion is constant with time delay, said second time delay means providing a plurality of second output taps;
   means connecting each of said second output taps with one of said elements of said first time delay means.

2. A system as defined in claim 1 in which the time spacing between adjacent said second output taps corresponds to the time delay provided by the element of said first time delay means connected to the first of said output taps.

3. A computing system for operating upon a first time function by a second time function which comprises:
   a first time delay means comprising at least one element having take-off taps along such element and in which the signal distortion in said element is an increasing function of time delay;
   a plurality of potentiometric networks, each potentiometric network having a plurality of potentiometric units, each said unit connected to one said output taps of said element of said first time delay means;
   adding circuits for each said potentiometric network for adding the outputs of the plurality of potentiometric units in each of said potentiometric network;
   a magnetic recording medium having a plurality of channels thereon including a record head for each channel and connected to each said adding circuit, each recording channel having a read out head spaced from said record head for reproducing the recorded signal at time spaced intervals;
   a final adding circuit means including means connecting said final adding circuit to each said read out head;
   recording means for recording the output from said final adding circuit.

4. A system as defined in claim 3 in which adjacent read out heads are spaced a distance from each other equal to the delay of said element of said first time delay means.

5. A computing system employing time delay apparatus of two types, a first type in which the signal distortion is an increasing function of time delay, and a second type for which the distortion is constant with time delay, comprising:
   (a) first time delay means comprising at least one delay element having a plurality of delay units of the first type, said delay units connected in series,
   (b) each of said at least one delay element having M take-out taps connected to the junctions of said delay units for presenting at specific time delays a first electrical signal applied to said first time delay means and where M is an integer,
   (c) K potentiometric networks, each such potentiometric network comprising M potentiometric units each connected to one of said M take-out taps for multiplying the voltage at each tap by a predetermined factor, representative of a second time function and where K is an integer,
   (d) K adder elements, each element adding the electrical outputs from the M potentiometric units in a potentiometric network,
   (e) second time delay means of the second type comprising K time delay devices of the second type providing varying time delays which are increments of time delay of the elements of said first delay means,
   (f) each of said potentiometric networks connected in series with a corresponding one of said K adder elements and a corresponding delay element to form a plurality of K computer channels, and
   (g) means to connect in parallel said K channels.

6. Apparatus as described in claim 5 in which said K potentiometric networks each having M potentiometric units connected in parallel to said M taps of a single time delay element.

7. Apparatus as defined in claim 5 in which said first time delay means comprises K delay elements and each of said K potentiometric networks is connected to the taps of a separate one of said delay elements.

8. Apparatus as defined in claim 7 in which means are provided for applying a first electrical signal to said second time delay means and each of said K time delay devices is connected to the input of one of said plurality of time delay elements.

9. Apparatus as defined in claim 7 in which said first electrical signal is applied in parallel to each of the K delay elements, and each of the K delay devices is connected at its input to one of the K adder elements.

10. Apparatus as in claim 5 in which said first time delay means comprises an electrical delay line.

11. Apparatus as in claim 5 in which said second time delay means comprises magnetic recorder means for recording an electrical signal and reading it out at a predetermined time later.

12. Apparatus as in claim 11 in which said magnetic recorder comprises a single track with a single record head and a plurality of spaced read out heads.

13. A computing device employing time delay apparatus of two types, a first type in which the signal distortion is an increasing function of time delay, and a second type for which the distortion is constant with time delay, comprising,
   (a) first time delay means of the first type comprising one time delay element including a plurality of delay units connected in series,
   (b) said delay element including M take-out taps connected to the junctions of the delay units for presenting at specific time delays a first electrical signal applied to said first time delay means, and where M is an integer,
   (c) K potentiometric networks each composed of M potentiometric units, such K sets of M potentiometric units connected in parallel to said M taps of said delay element, said M units set to predetermined multiplying factors representative of a second time function and where K is an integer, (d) K adder elements means for adding the outputs of the M potentiometric units in each potentiometric network, (e) second time delay means having inputs and outputs and comprising a plurality of K time delay devices of the second type providing varying time delays which are increments of the time delay of a unit of said time delay element, and (f) adder means connected to the outputs of the K time delay devices.

14. Apparatus as in claim 13 in which said first time delay means is a lumped constant electrical delay line, and said second time delay means is a magnetic recording means having spaced read out heads.

References Cited
UNITED STATES PATENTS

| | | |
|---|---|---|
| 3,069,507 | 12/1962 | David. |
| 3,112,397 | 11/1963 | Crook _____ 340—15.5 |
| 3,136,974 | 6/1964 | Sirks. |
| 3,145,341 | 8/1964 | Andrew _____ 235—181 X |
| 3,270,188 | 8/1966 | Ares _____ 235—181 |

MALCOLM A. MORRISON, *Primary Examiner.*

J. F. RUGGIERO, *Assistant Examiner.*